United States Patent
Leu et al.

(10) Patent No.: US 7,254,019 B2
(45) Date of Patent: Aug. 7, 2007

(54) HEAT DISSIPATION MODULE FOR HINGED MOBILE COMPUTER

(75) Inventors: Charles Leu, Fremont, CA (US); Tai-Cherng Yu, Tu-Cheng (TW); Ga-Lane Chen, Fremont, CA (US); Jhy-Chain Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 114 days.

(21) Appl. No.: 11/283,285

(22) Filed: Nov. 17, 2005

(65) Prior Publication Data

US 2006/0109622 A1  May 25, 2006

(30) Foreign Application Priority Data

Nov. 19, 2004  (CN) .................. 2004 2 0095664

(51) Int. Cl.
  *H05K 7/20* (2006.01)
(52) U.S. Cl. ............... 361/687; 361/689; 361/695; 165/121; 165/104.33; 174/15.2
(58) Field of Classification Search ................ 361/686, 361/687, 692–695, 698–702, 704–712, 714–722; 165/80.2, 80.3, 104.33, 185, 104.21–104.26; 174/15.1, 15.2, 16.3; 62/259.2; 454/184; 16/223
See application file for complete search history.

(56) References Cited

U.S. PATENT DOCUMENTS 5,847,925 A    12/1998  Progl et al.
6,031,716 A *  2/2000  Cipolla et al. .............. 361/687
6,175,493 B1 * 1/2001  Gold .......................... 361/687
6,250,378 B1 * 6/2001  Kobayashi ............. 165/104.33
6,253,836 B1 * 7/2001  Mitchell ....................... 165/86
6,288,896 B1 * 9/2001  Hsu ........................... 361/687
6,341,062 B1   1/2002  Patel
6,459,576 B1 * 10/2002 Bhatia et al. ............... 361/687
6,507,490 B2 * 1/2003  Sasaki et al. ............... 361/687
6,751,095 B2 * 6/2004  Ishikawa et al. ............ 361/687
6,816,371 B2 * 11/2004 Agata et al. ................ 361/687

FOREIGN PATENT DOCUMENTS

JP          11330757 A  * 11/1999
JP       02000277963 A  * 10/2000
JP       02001068883 A  *  3/2001
TW           425501 A   *  3/2001

* cited by examiner

*Primary Examiner*—Michael Datskovskiy
(74) *Attorney, Agent, or Firm*—Morris Manning & Martin LLP; Tim Tingkang Xia, Esq.

(57) ABSTRACT

A heat dissipation module for a mobile computer, the mobile computer having a base (10) and a display unit (20) pivotally coupled to the base, the base having a number of through holes (13) defined on a shell (18) thereof, the heat dissipation module including: a cooling fan (14) disposed near the through holes of the shell; and a heat pipe (15) having a evaporating section (52), a condensing section (56), and an intermediate section (54) connecting the evaporating section and the condensing section; wherein the evaporating section of the heat pipe is disposed between the shell and the cooling fan, and the condensing section of the heat pipe is disposed on the display unit of the mobile computer.

20 Claims, 3 Drawing Sheets

HEAT DISSIPATION MODULE FOR HINGED MOBILE COMPUTER

BACKGROUND OF THE INVENTION

1. Field of the Invention

The invention relates generally to devices for transferring and dispersing heat of a heat-generating electronic device and, more particularly to devices for transferring and dispersing heat of an electronic device in a hinged mobile computer.

2. Description of Related Art

Successive new models of mobile computers, such as notebook computers, are continuing to shrink in size and become lighter, smaller and thinner. In addition, with the improvement of the functionality of such computers, electrical power consumed by many of these computers continues to increase. Thus, heat generated from microprocessors, disk drives, power supplies and other components of the computers is often increased. Accordingly, heat dissipation devices having relative small sizes and high efficiency of heat dissipation are required to be installed in such computers.

Heat pipes are widely used in notebook computers for dissipating heat, due to their properties of light weight, compact size and high thermal conductivity. For example, a conventional heat dissipation module for dissipating heat from a notebook computer employs a heat pipe. The notebook computer includes a base and a display unit pivotally connected to the base. One end of the heat pipe, i.e., an evaporating section, is disposed in contact with an electrical component (such as a microprocessor) inside the base of the computer for absorption of heat generated by the component. Another end of the heat pipe, i.e., a condensing section, is disposed at a shell of the base for dispersing the heat to the environment. A number of through holes are defined in the shell of the base where the condensing section is located, for expelling heat therethrough with the aid of an electric fan.

In this configuration, heat generated by the electrical component is extracted therefrom and transferred away. Thereby, a temperature of the electrical component is lowered, and an operational reliability of the electrical component is improved. However, the heat extracted from the electrical component is not discharged outside of the base of the computer. Instead, the heat extracted from the electrical component is merely transferred onto the shell of the computer. Although part of the heat can be dispersed by means of the electric fan, a considerable part of the heat remains accumulated around the condensing section of the heat pipe. Therefore when the computer operates for a relatively long period of time, a local temperature of the shell around the condensing section of the heat pipe may increase to beyond a safe threshold level. This can reduce the reliability and operational lifetime of components located around the hot area.

Therefore, what is needed is a heat dissipation device that can disperse heat from the base efficiently and uniformly.

SUMMARY

In a preferred embodiment, a heat dissipation module for a mobile computer is provided. The mobile computer includes a base and a display unit pivotally coupled to the base. The base has a ventilating portion for allowing an airflow to pass therethrough. The heat dissipation module comprises a heat pipe having an evaporating section, a condensing section and a flexible intermediate section. The evaporating section is adapted for being disposed adjacent the ventilating portion of the base. The condensing section is adapted for being coupled to the display unit of the mobile computer. The heat dissipation module further includes a cooling fan for being disposed spatially corresponding to the evaporating section.

Preferably, the evaporating section of the heat pipe is concertinaed. The intermediate section extends from the base to the display unit.

Preferably, the heat dissipation module further comprises a thermal conductive plate disposed between the condensing section of the heat pipe and the display unit.

More preferably, the thermal conductive plate has a thermal conductivity coefficient as least as high as that of copper.

Other advantages and novel features will become more apparent from the following detailed description of preferred embodiments when taken in conjunction with the accompanying drawings, in which:

Figure 1:
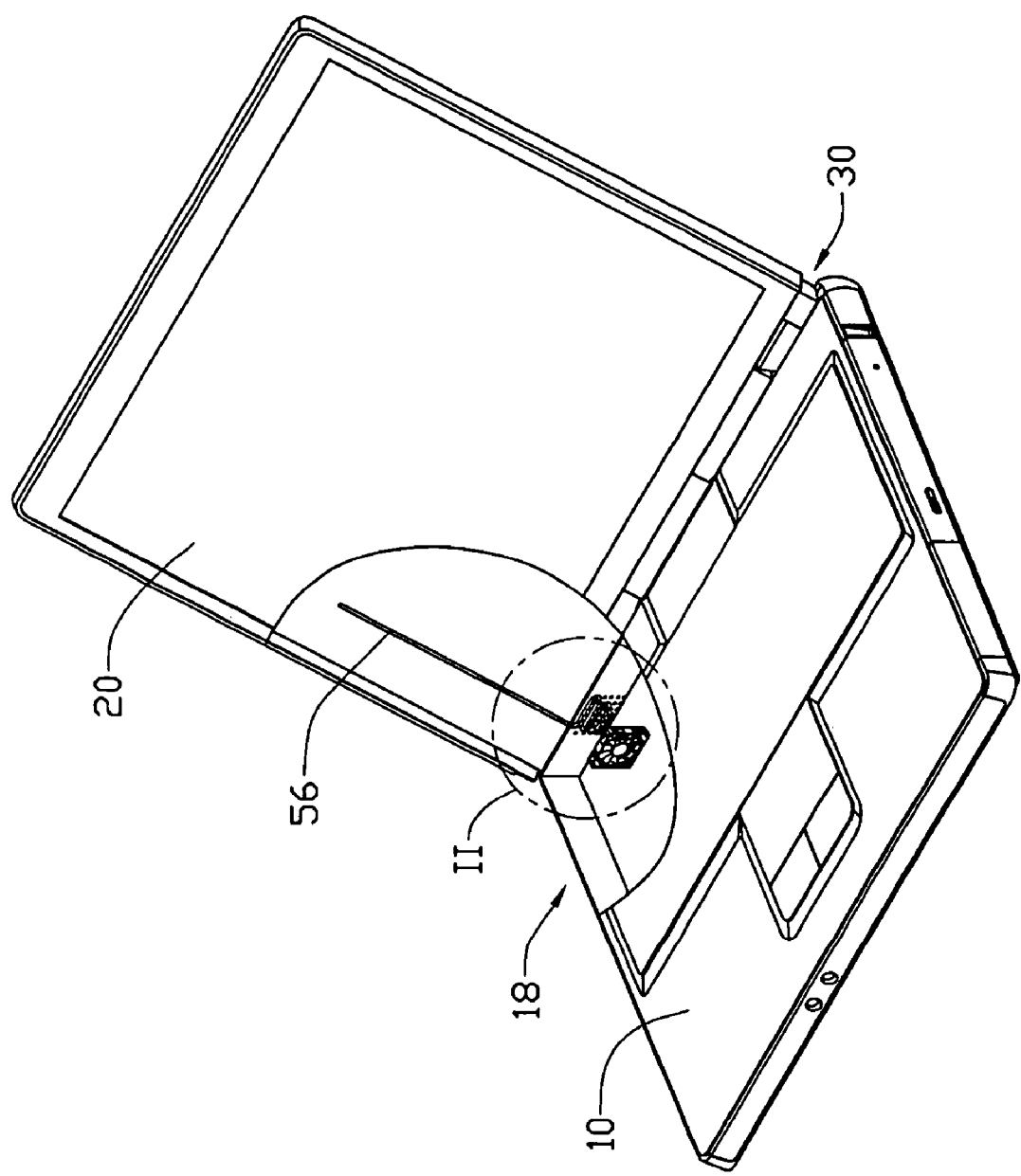
FIG. 1 is an isometric, cutaway view of a notebook computer having a heat dissipation module according to a first preferred embodiment of the present invention.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Reference will now be made to the drawings to describe preferred embodiments of the present invention in detail.

Figure 2:
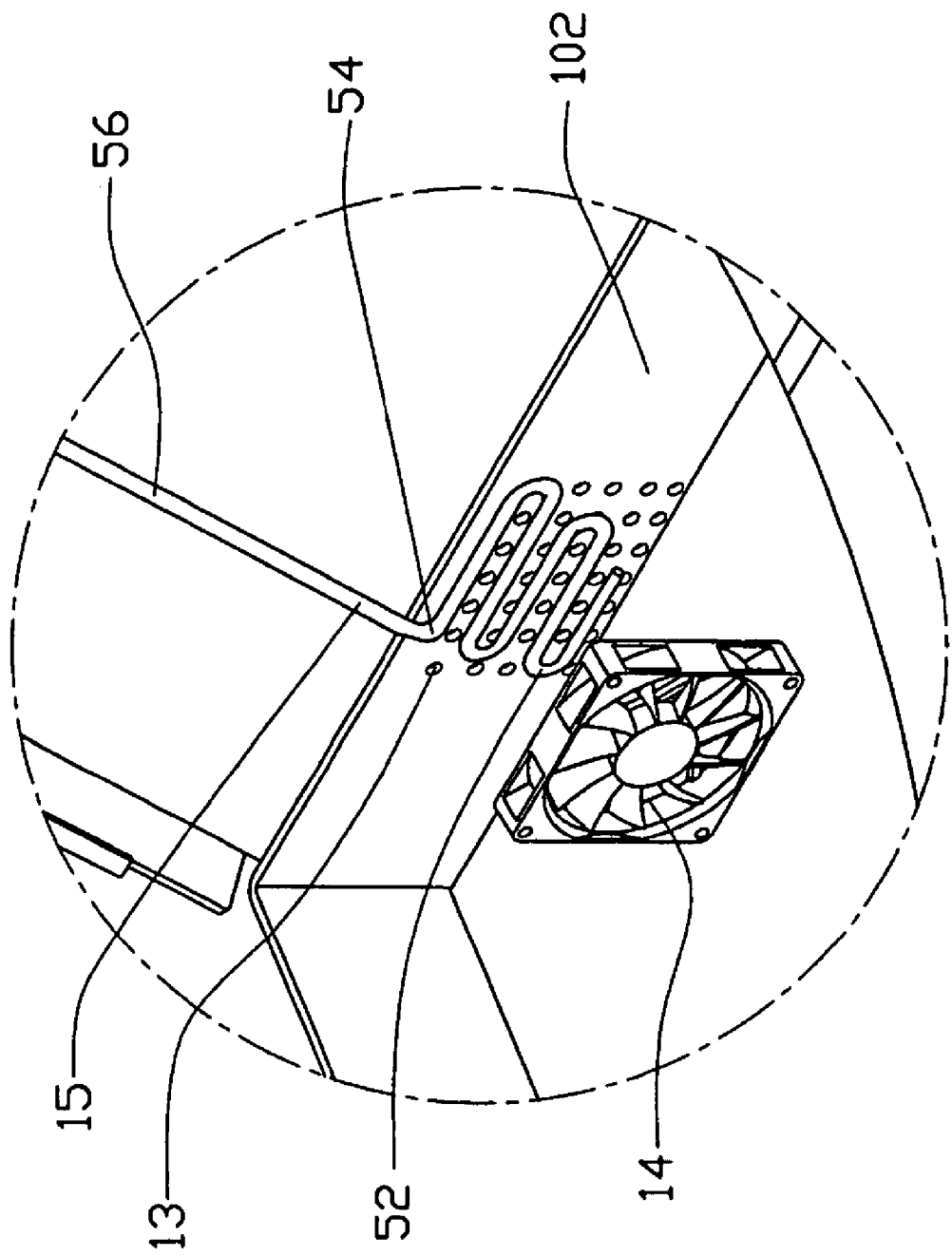
FIG. 2 is an enlarged view of a circled portion II of FIG. 1.

Referring to FIGS. 1 and 2, a heat dissipation module used in an electronic device like a mobile computer device, i.e., a notebook according to a first preferred embodiment is shown. The notebook includes a base 10 and a display unit 20. A hinge assembly 30 is attached to the base 10 and the display unit 20 for permitting the display unit 20 to move between an open position (as shown in FIG. 1) and a closed position. The base 10 includes a shell 18 for accommodating electronic components (not visible) therein; for example, a microprocessor, disk drives, storage devices, etc. A number of through holes 13 is defined in the shell 18 for permitting a cooling airflow to pass therethrough. For example, the through holes 13 can be defined in a left side, a right side or a rear side of the shell 18. Preferably, the through holes 13 are defined in a rear wall 102 of the base 10 (as shown in FIG. 2). More preferably, the through holes 13 are arranged in a regular array in the rear wall 102. For example, the through holes 13 may be configured to form an array having seven columns and five rows, as best shown in FIG. 2.

The heat dissipation module includes a cooling fan 14 and a heat pipe 15. The cooling fan 14 is disposed near the through holes 13, such that hot air inside the base 10 can be extracted by the cooling fan 14 and forced to an outside of the base 10 through the through holes 13. The heat pipe 15 includes an evaporating section 52, a flexible intermediate section 54, and a condensing section 56. The evaporating section 52 and the condensing section 56 are interconnected via the intermediate section 54. Preferably, the intermediate section 54 is thermally inert.

The evaporating section 52 is disposed between the cooling fan 14 and the rear wall 102 for absorbing the heat. The condensing section 56 is located at the display unit 20 for discharging the heat to the display unit 20. The intermediate section 54 is disposed near the hinge assembly 30, and extends from the base 10 to the display unit 20 for allowing the display unit 20 to move between the open position and the closed position. Preferably, the evaporating section 52 of the heat pipe 15 is zigzagged. The zigzagged evaporating section 52 can be attached to the rear wall 102 between the columns of the through holes 13, or between rows of the through holes 13 (as shown in FIG. 2). Therefore, an airflow produced by the cooling fan 14 can pass through the through holes 13 without being blocked by the heat pipe 15.

It is noted that the evaporating section 52 and/or the condensing section 56 can be have various shapes; for example, a cross section thereof may be rectangular, polygon, circular, etc. Preferably, the evaporating section 52 is pressed into a flatened shape for providing a larger surface area for absorbing heat.

In use, heat generated by the electronic components inside the base 10 is dispersed to the ambient air inside the shell 18. The hot air is extracted by the cooling fan 14 and flows out of the base 10 through the through holes 13. In addition, the heat is absorbed by the evaporating section 52 of the heat pipe 15, and then is transferred to the condensing section 56 via the intermediate section 54 for dispersing heat uniformly. Therefore, the local temperature of the area near the through holes 13 is lowered, and the aforementioned problems of a conventional notebook computer are solved or at least mitigated.

Figure 3:
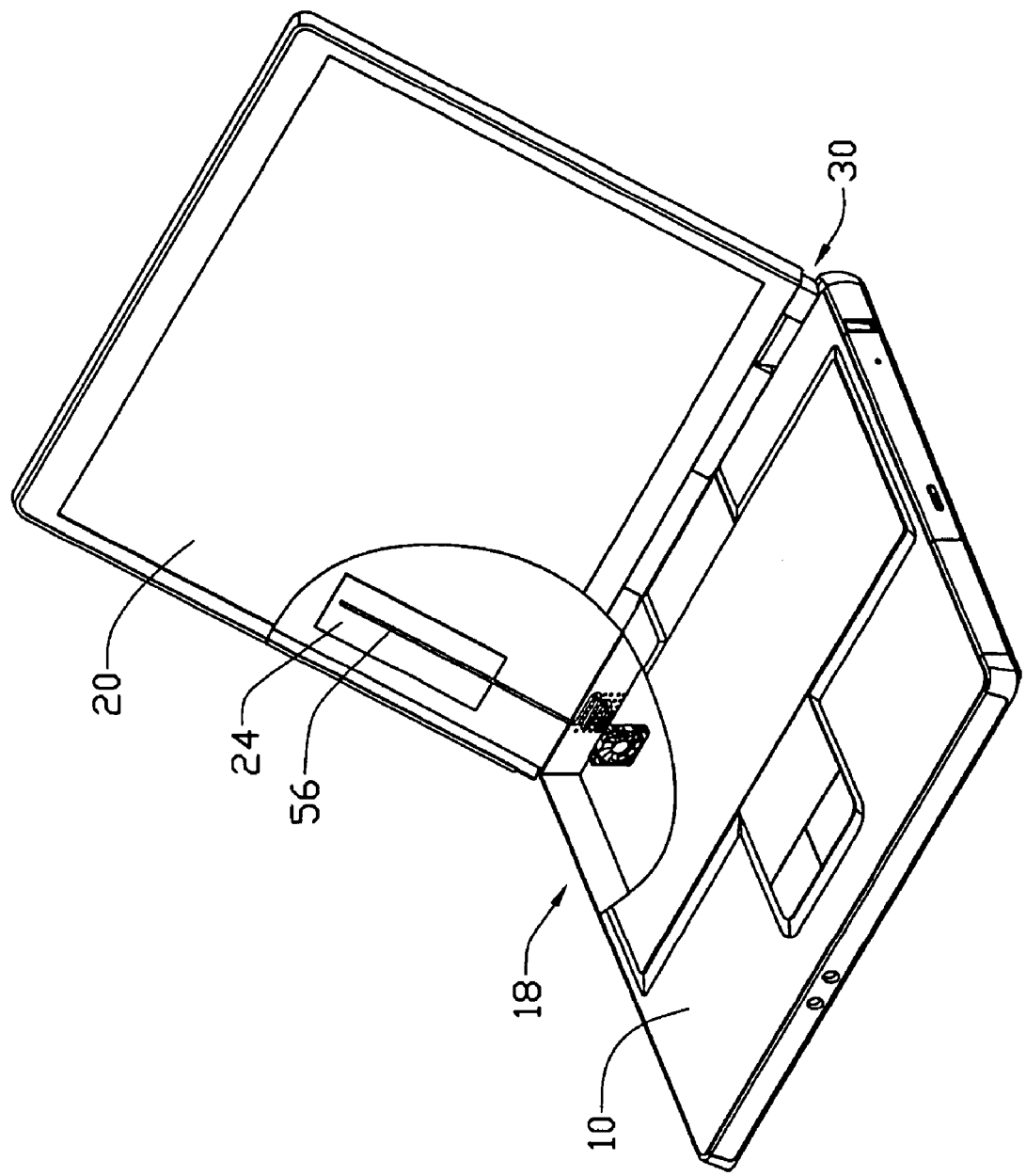
FIG. 3 is an isometric, cutaway view of a notebook computer having a heat dissipation module according to a second preferred embodiment of the present invention.

Referring to FIG. 3, a heat dissipation module according to a second preferred embodiment of the present invention is shown. The second preferred embodiment is substantially the same as the first preferred embodiment, except that the heat dissipation module further includes a thermal conductive plate 24 disposed on the display unit 20. The condensing section 56 of the heat pipe 15 is attached to the thermal conductive plate 24 for discharging heat to the thermal conductive plate 24. Preferably, the thermal conductive plate 24 has a thermal conductive coefficient at least as high as that of copper. In this embodiment, the thermal conductive plate 24 is made of copper. Therefore, heat dissipated from the condensing section 56 can be uniformly and quickly dispersed through the thermal conductive plate 24 to the display unit 20, and then dispersed to the ambient air.

In the above embodiments, only one heat dissipation module is employed. It is understood that two or more heat dissipation modules may be implemented in the notebook computer where necessary.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A heat dissipation module for use in a mobile computer, the mobile computer having a base and a display unit pivotally coupled to the base, the base having a ventilating portion, the heat dissipation module comprising:

a heat pipe having an evaporating section, a condensing section, and a flexible intermediate section; the evaporating section being adapted for being disposed adjacent the ventilating portion of the base, the condensing section being adapted for being coupled to the display unit of the mobile computer; and a cooling fan for being disposed spatially corresponding to the evaporating section.

2. The heat dissipation module as claimed in claim 1, wherein the evaporating section of the heat pipe is concertinaed.

3. The heat dissipation module as claimed in claim 1, wherein the evaporation section is flat.

4. The heat dissipation module as claimed in claim 1, wherein the intermediate section is adapted for extending from the base to the display unit.

5. The heat dissipation module as claimed in claim 1, wherein the intermediate section is thermally inert.

6. The heat dissipation module as claimed in claim 1, further comprising a thermally conductive plate, for being disposed between the condensing section of the heat pipe and the display unit.

7. The heat dissipation module as claimed in claim 6, wherein the thermally conductive plate is comprised of a metal having a thermally conductive coefficient at least as high as that of copper.

8. The heat dissipation module as claimed in claim 6, wherein the evaporating section of the heat pipe is concertinaed.

9. The heat dissipation module as claimed in claim 6, wherein the evaporation section is flat.

10. The heat dissipation module as claimed in claim 6, wherein the intermediate section is adapted for extending from the base to the display unit.

11. The heat dissipation module as claimed in claim 6, wherein the intermediate section is thermally inert.

12. A heat dissipation module for use in a mobile computer, the mobile computer comprising a base and a display unit hinged on the base, the base comprising a plurality of through holes defined in a ventilating portion of the base, the heat dissipation module comprising:

a cooling fan for being disposed near the through holes of the ventilating portion; and a heat pipe having an evaporating section, a condensing section, and a flexible intermediate section; wherein the evaporating section is for being disposed between the ventilating portion and the cooling fan, and the condensing section of the heat pipe is for being disposed on the display unit.

13. The heat dissipation module as claimed in claim 12, wherein the evaporating section of the heat pipe is concertinaed.

14. The heat dissipation module as claimed in claim 12, further comprising a thermally conductive plate for being disposed between the condensing section of the heat pipe and the display unit.

15. An electronic device comprising:

a base for accommodating electronic components of said electronic device therein, a ventilating portion defined on said base beside said electronic components so as to allow an interior of said base communicable with an outside of said electronic device, higher-temperature air caused by said accommodated electronic components capable of being forced to move toward said ventilating portion along a path between said ventilating portion and said electronic components in said base; and a heat dissipation module disposed in said path and spaced from said electronic components, said heat dissipation module capable of absorbing heat from said higher-temperature air passing through said path and transferring said heat out of said path.

16. The electronic device as claimed in claim 15, wherein said ventilating portion defines a plurality of through holes therein.

17. The electronic device as claimed in claim 15, wherein said heat dissipation module comprises at least one heat pipe extending an evaporating section thereof in said base, a condensing section thereof out of said base and a flexible intermediate section thereof connected between said evaporating section and said condensing section.

18. The electronic device as claimed in claim 17, wherein said evaporating section of said heat pipe is attachable to said base beside said ventilating portion without hindering said air from passing through said ventilating portion.

19. The electronic device as claimed in claim 17, further comprising a thermal conductive plate attachable to said condensing section of said heat pipe for heat dissipation of said condensing section.

20. The electronic device as claimed in claim 15, wherein said heat dissipation module comprises a fan disposed in said path to face said ventilating portion and spaced from said electronic components so as to force movement of said higher-temperature air toward said ventilating portion.

* * * * *